United States Patent
Saruwatari et al.

(10) Patent No.: US 7,278,334 B2
(45) Date of Patent: Oct. 9, 2007

(54) ELECTRIC POWER STEERING APPARATUS

(75) Inventors: Takehiro Saruwatari, Kashiwara (JP);
Tetsuya Murakami, Nara (JP); Hiroshi Murataka, Yamato-Koriyama (JP);
Akihiro Hironaka, Yamato-Koriyama (JP)

(73) Assignees: Jtekt Corporation, Osaka (JP); Gates Unitta Asia Company, Osaka (JP)

(*) Notice: Subject to any disclaimer, the term of this patent is extended or adjusted under 35 U.S.C. 154(b) by 319 days.

(21) Appl. No.: 10/823,684

(22) Filed: Apr. 14, 2004

(65) Prior Publication Data

US 2004/0221668 A1 Nov. 11, 2004

(30) Foreign Application Priority Data

Apr. 15, 2003 (JP) ............... 2003-110674

(51) Int. Cl.
*F16H 35/00* (2006.01)
*B62D 5/04* (2006.01)

(52) U.S. Cl. ............... 74/388 PS; 180/444

(58) Field of Classification Search ........... 74/388 PS, 74/424.71, 89.26; 180/443, 444; 474/117
See application file for complete search history.

(56) References Cited

U.S. PATENT DOCUMENTS

| | | | | |
|---|---|---|---|---|
| 4,631,044 A | * | 12/1986 | Redmon | 474/114 |
| 4,686,433 A | * | 8/1987 | Shimizu | 318/50 |
| 4,825,972 A | * | 5/1989 | Shimizu | 180/444 |
| 6,938,722 B2 | * | 9/2005 | Sasaki et al. | 180/444 |
| 6,960,145 B2 | * | 11/2005 | Fraley et al. | 474/134 |
| 2002/0148672 A1 | | 10/2002 | Tatewaki et al. | |
| 2007/0066431 A1 | | 3/2007 | Hironaka | |

FOREIGN PATENT DOCUMENTS

| | | |
|---|---|---|
| DE | 100 52 275 A 1 | 5/2002 |
| FR | 2 686 959 | 8/1993 |
| JP | 62-655274 | 11/1987 |
| JP | 64-26048 | 1/1989 |
| JP | 4-28583 | 5/1992 |
| JP | 6-123333 | 5/1994 |
| JP | 9-119482 | 5/1997 |
| JP | 11-13840 | 1/1999 |
| JP | 11-138935 | 5/1999 |
| JP | 2000-46136 | 2/2000 |
| JP | 2002-54720 | 2/2002 |
| JP | 2002-054720 A * | 2/2002 |
| JP | 2003-2219 | 1/2003 |
| JP | 2004-308702 | 11/2004 |
| WO | WO 03/011674 A1 | 2/2003 |

OTHER PUBLICATIONS

English-language abstract of JP 2001-159449 (date of the publication is Jun. 12, 2001).
English-language abstract of JP 2000-250279 (date of the publication is Sep. 14, 2000).

* cited by examiner

*Primary Examiner*—Thomas R. Hannon
*Assistant Examiner*—James Pilkington
(74) *Attorney, Agent, or Firm*—Rabin & Berdo, PC

(57) ABSTRACT

An electric power steering apparatus comprises an electric motor for producing a steering assist force, and a speed reduction mechanism for decelerating the rotation of an output shaft in the electric motor. The speed reduction mechanism comprises an input pulley driven by the electric motor, an output pulley connected to a steering shaft, and a belt for connecting the input pulley and the output pulley to each other. The belt comprises a helical toothed belt. The input pulley and the output pulley respectively include helical toothed pulleys meshed with the helical toothed belt.

15 Claims, 8 Drawing Sheets

ELECTRIC POWER STEERING APPARATUS

BACKGROUND OF THE INVENTION

1. Field of the Invention

The present invention relates to an electric power steering apparatus that produces a steering assist force by an electric motor.

2. Description of Related Art

In a rack assist type electric power steering apparatus that provides a steering assist force through a rack shaft, the rotation of an output shaft in an electric motor is decelerated through a speed reduction mechanism composed of a pulley belt mechanism. The output rotation of the speed reduction mechanism is converted into the axial movement of a rack shaft through a ball screw mechanism, for example, surrounding the rack shaft (see Japanese Unexamined Patent Publication No. 62-4673 (1987), for example).

An advantage of this case is that a belt is interposed in a power transmission path between the electric motor and the rack shaft, so that shock loading and vibration from the rack shaft are not transmitted to the electric motor.

In order to reduce a torque transmission loss by the sliding of the belt, it is considered that toothed pulleys and a toothed belt are used for the pulley belt mechanism.

However, there is a case where vibration and noise are produced by the mesh of the teeth of the belt and the teeth of each of the pulleys at the time of steering, which are transmitted to a housing, and are propagated inside of a vehicle to be noise.

SUMMARY OF THE INVENTION

Therefore, an object of the present invention is to reduce, in an electric power steering apparatus having a speed reduction mechanism composed of a belt transmission, vibration and noise.

In a preferred mode of the present invention, an electric power steering apparatus comprises an electric motor for producing a steering assist force, and a speed reduction mechanism for decelerating the rotation of an output shaft in the electric motor. The speed reduction mechanism comprises an input pulley driven by the electric motor, an output pulley connected to a steering shaft, and a belt for connecting the input pulley and the output pulley to each other. The belt includes a helical toothed belt, and the input pulley and the output pulley respectively include helical toothed pulleys meshed with the helical toothed belt.

In the present mode, the movement in the mesh of the teeth of the belt and the teeth of each of the pulleys can be smoothed, thereby making it possible to significantly reduce vibration and noise.

DETAILED DESCRIPTION OF THE PREFERRED EMBODIMENTS

Figure 1:
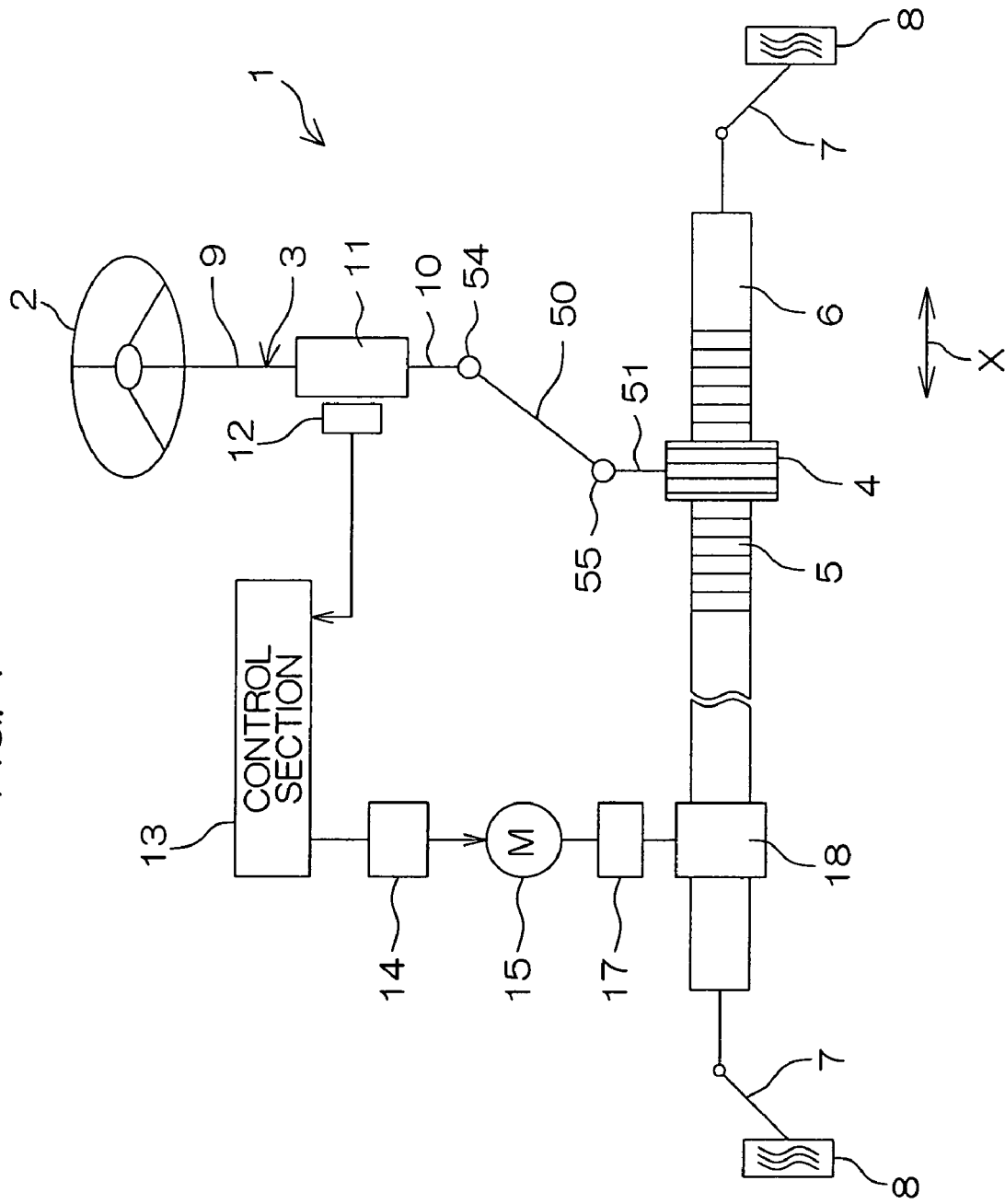
FIG. 1 is a schematic view showing the schematic configuration of an electric power steering apparatus according to an embodiment of the present invention.

A preferred embodiment of the present invention will be described while referring to the drawings.

FIG. 1 is a schematic view showing the schematic configuration of an electric power steering apparatus according to a first embodiment of the present invention. Referring to FIG. 1, an electric power steering apparatus (EPS) 1 comprises a steering shaft 3 connected to a steering wheel 2 serving as a steering member, an intermediate shaft 50 connected to the steering shaft 3 through a universal joint 54, a pinion shaft 51 serving as a steering shaft connected to the intermediate shaft 50 through a universal joint 55, and a rack shaft 6 serving as a steering shaft having a rack 5 meshed with a pinion 4 provided at a front end of the pinion shaft 51 and extending along a width X of a vehicle.

Tie rods 7 are respectively coupled to both ends of the rack shaft 6, and each of the tie rods 7 is connected to a corresponding wheel 8 through a corresponding knuckle arm (not shown). When the steering wheel 2 is operated to rotate the steering shaft 3, the rotation is converted into the linier motion of the rack shaft 6 along the width X of the vehicle by the pinion 4 and the rack 5. Consequently, the steering of the wheel 8 is achieved.

The steering shaft 3 is divided into an input shaft 9 serving as a first shaft connected to the steering wheel 2 so as to be integrally rotatable and an output shaft 10 serving as a second shaft and as a steering shaft connected to the pinion 4. The input shaft 9 and the output shaft 10 are coaxially connected to each other through a torsion bar 11.

There is provided a torque sensor 12 for sensing a steering torque by an amount of relative rotational displacement between the input shaft 9 and output shaft 10 through the torsion bar 11, and the results of the sensing of the torque by the torque sensor 12 are given to a control section 13. In the control section 13, a voltage to be applied to an electric motor 15 for steering assist through a driver 14 is controlled on the basis of the results of the sensing of the torque and the results of sensing of the speed of the vehicle, for example. The rotation of an output shaft 16 (see FIG. 2) in the electric motor 15 is decelerated through a speed reduction mechanism 17 including a pulley belt mechanism. The output rotation of the speed reduction mechanism 17 is converted into the axial movement of the rack shaft 6 through a conversion mechanism 18, to assist in steering. The electric power steering apparatus 1 is of a so-called rack assist type.

Figure 2:
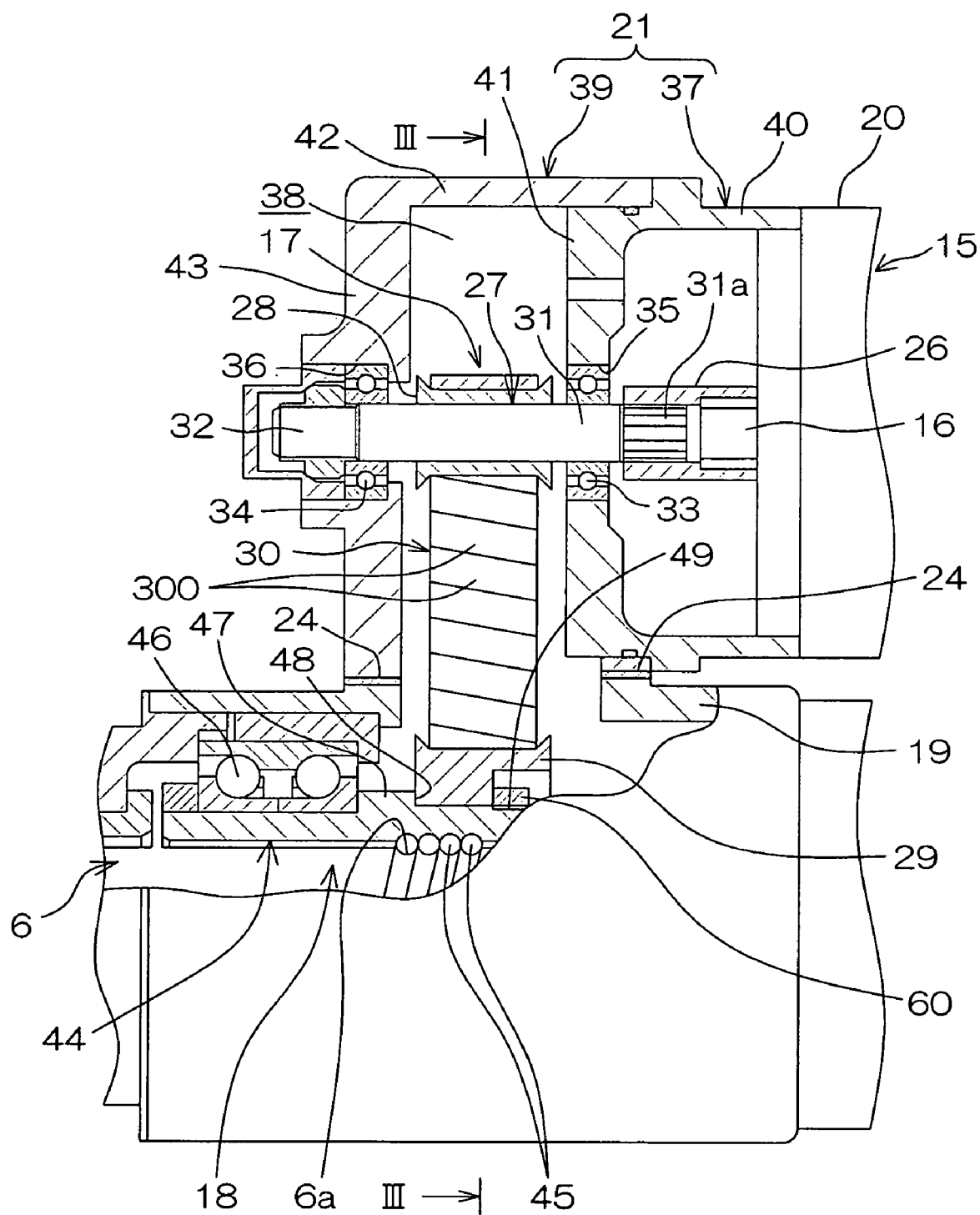
FIG. 2 is a cross-sectional view showing a principal part of the electric power steering apparatus.
Figure 3:
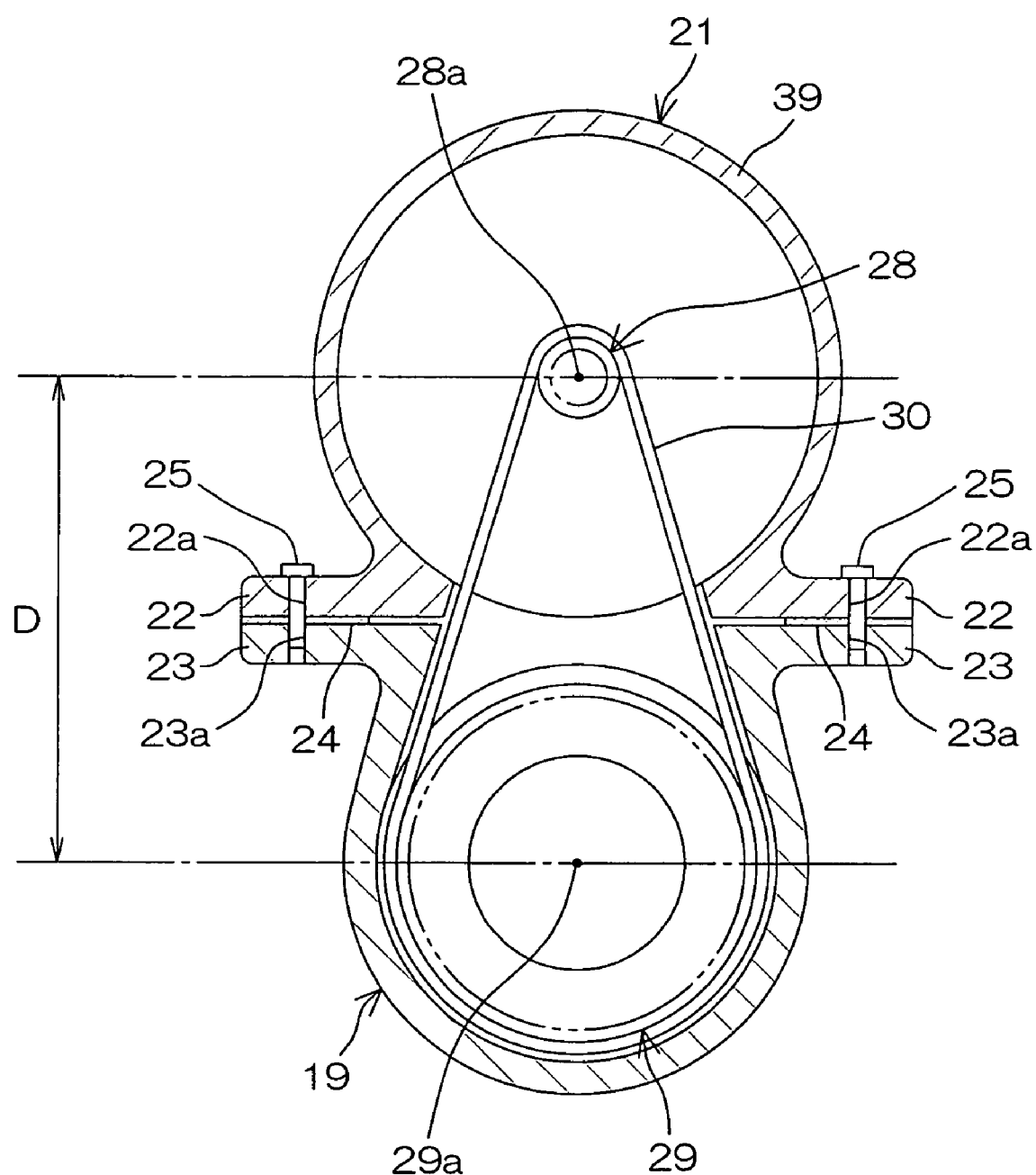
FIG. 3 is a schematic sectional view taken along a line III-III shown in FIG. 2.

FIG. 2 is an enlarged view showing a principal part of the electric power steering apparatus 1, and FIG. 3 is a schematic sectional view taken along a line III-III shown in FIG. 2.

Referring to FIGS. 2 and 3, a motor housing 20 in the electric motor 15 is fixed to a second housing 19 through a first housing 21. The electric motor 15 is provided by the side of the second housing 19. The first housing 21 holds an input pulley, described later, in the speed reduction mechanism 17. The second housing 19 functions as a rack housing which accommodates the rack shaft 6.

The first housing 21 has a cylindrical shape as a whole, and is provided with mounting flanges 22 serving as a pair of opposite sections to have an approximately Ω shape in cross section. The second housing 19 has mounting flanges 23 serving as opposite sections respectively opposed to the mounting flanges 22 in the first housing 21. Both the mounting flanges 22 and 23 are fastened to each other by a screw 25 with a spacer 24 such as a shim interposed between the mounting flanges 22 and 23. The screw 25 is screwed into a screw hole 23a of the mounting flange 23 after being inserted through a screw through hole 22a of the mounting flange 22, for example. The distance between the first housing 21 and the second housing 19 is adjusted by adjusting the thickness of the spacer 24, thereby achieving the tension adjustment of a belt 30 through the adjustment of the distance between axes 28a and 29a (the distance between centers D) of input and output pulleys 28 and 29, as shown in FIG. 3.

The speed reduction mechanism 17 comprises an input shaft 27 coaxially connected to the output shaft 16 in the electric motor 15 through a joint 26 using a spline 31a, for example, a small-diameter input pulley 28 provided in an intermediate portion in the axial direction of the input shaft 27 so as to be integrally rotatable, a large-diameter output pulley 29 arranged around the rack shaft 6 serving as a steering shaft, and a toothed belt 30 wound between the input and output pulleys 28 and 29.

Figure 4:
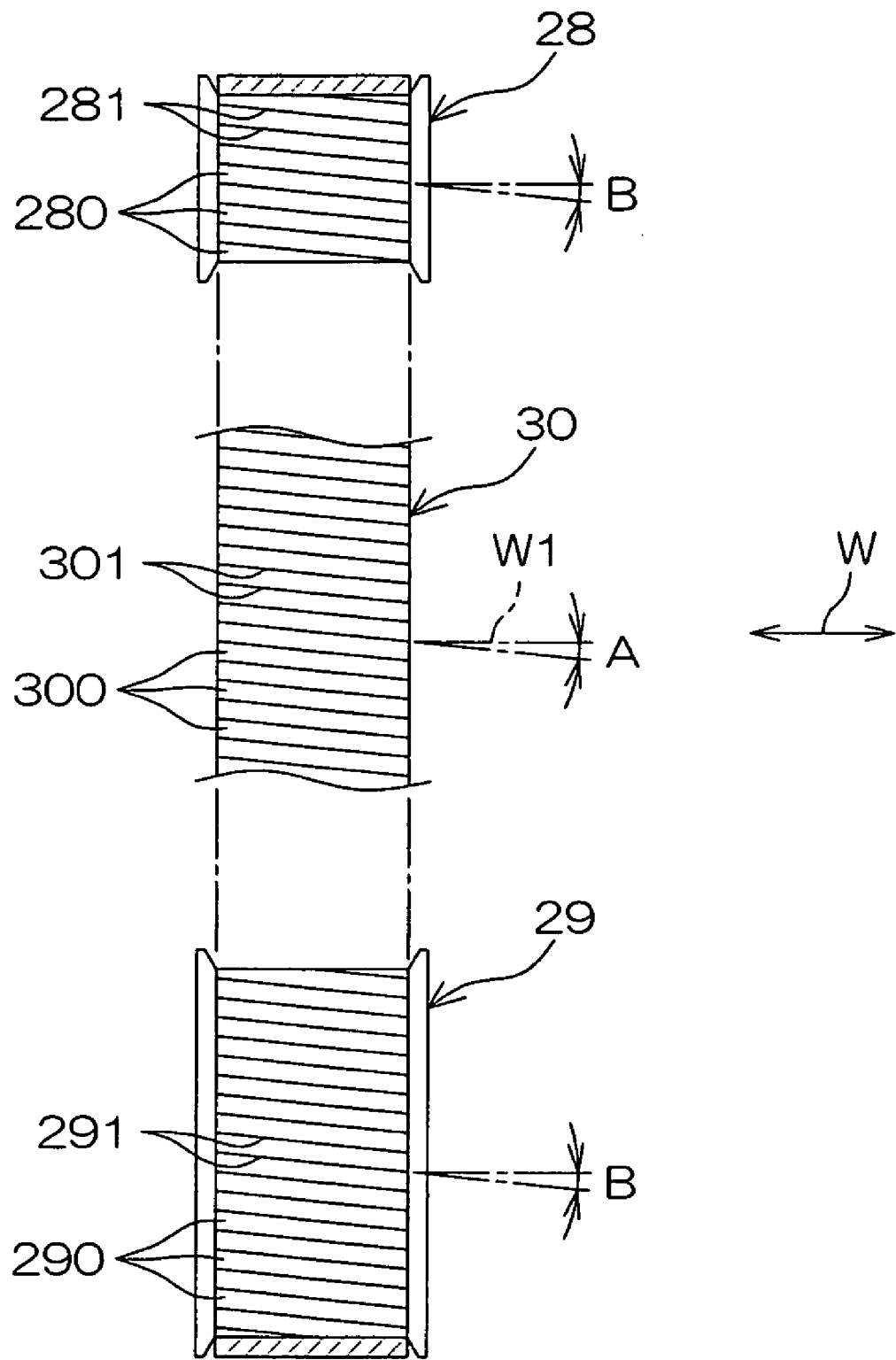
FIG. 4 is a schematic view of a speed reduction mechanism.

Referring to FIG. 4, the toothed belt 30 has helical teeth 300 whose tooth traces 301 are inclined at a predetermined angle of inclination A along its width direction W. The input pulley 28 is constructed in the outer periphery of the input shaft 27 as a toothed pulley having helical teeth 280 which are equally spaced in the circumferential direction and meshed with the helical teeth 300 of the toothed belt 30. The tooth traces 281 of the helical teeth 280 are inclined at an angle of inclination B. Similarly, the output pulley 29 is constructed as a toothed pulley having helical teeth 290 which are equally spaced in the circumferential direction. The tooth traces 291 of the helical teeth 290 are inclined an angle of inclination B. The angle of inclination B corresponds to an angle of torsion of the tooth traces 281 and 291, and is set to an angle equal to the angle of inclination A.

It is preferable in reducing a thrust force received by the belt 30 that the angles of inclination A and B are not more than 10 degrees (A≦10 degrees and B≦degrees).

Referring to FIG. 2 again, the input shaft 27 has first and second ends 31 and 32, the first and second ends 31 and 32 are respectively supported so as to be rotatable by corresponding supporting holes 35 and 36 of the first housing 21 through corresponding bearings 33 and 34.

The first end 31 of the input shaft 27 is connected to the output shaft 16 in the electric motor 15 so as to be integrally rotatable through the joint 26.

The first housing 21 comprises a connecting housing 37 connected to the motor housing 20 so as to cover a portion where the output shaft 16 projects from the motor housing 20, and a speed reduction mechanism housing 39 for defining an accommodation chamber 38 which accommodates a principal part of the speed reduction mechanism 17 in cooperation with the connecting housing 37.

The connecting housing 37 has a cylindrical shape, and accommodates the above-mentioned joint 26 in its inner part. The connecting housing 37 has a peripheral wall 40 and an end wall 41. The end wall 41 is provided with the above-mentioned supporting hole 35.

The speed reduction mechanism housing 39 has a peripheral wall 42 and an end wall 43 which are fitted in the peripheral wall 40 of the connecting housing 37 in a liquid-tight manner. The end wall 43 is provided with the above-mentioned supporting hole 36. The input pulley 28 is accommodated in the accommodation chamber 38 defined by the connecting housing 37 and the speed reduction mechanism housing 39. The above-mentioned mounting flanges 22 are provided in both the connecting housing 37 and the speed reduction mechanism housing 39.

As the conversion mechanism 18, rotary motion can be converted into linear motion using a ball screw mechanism or a bearing screw mechanism, for example (see Japanese Unexamined Patent Publication No. 2000-46136, for example). In the present embodiment, description is made in conformity with an example in which the ball screw mechanism is used.

The conversion mechanism 18 comprises a ball nut 44 serving as a rotating cylinder surrounding the rack shaft 6, a ball screw groove 6a formed on an outer peripheral surface in an intermediate portion of the rack shaft 6, and a ball 45 interposed between the ball nut 44 and the ball screw groove 6a.

The ball nut 44 is supported so as to be rotatable on the rack housing 19 through a bearing 46. The above-mentioned output pulley 29 is fitted so as to be integrally rotatable in the outer periphery 47 of the ball nut 44. Specifically, the output pulley 29 is interposed between a step 48 formed in the outer periphery 47 of the ball nut 44 and a fixed screw 60 screwed into a screw 49 in the outer periphery 47, to fix the output pulley 29 to the ball nut 44.

According to the present embodiment, vibration and noise produced by the mesh of teeth can be reduced by using the helical teeth 280, 290, and 300 in each of the pulleys 28 and 29 and the belt 30, thereby making it possible to significantly reduce vibration and noise which are propagated inside of the vehicle. Particularly, it is possible to prevent the belt 30 from being offset and prevent friction from being created by setting the angle of inclination A of the teeth traces 301 of the helical teeth 300 of the belt 30 and the angle of inclination B of the respective tooth traces 281 and 291 of the helical teeth 280 and 290 of each of the pulleys 28 and 29 to not more than 10 degrees. As a result, the durability can be improved.

Moreover, the tension of the belt 30 can be adjusted easily and at low cost by adjusting the thickness of the spacer 24, thereby making it possible to reduce noise related to the belt 30.

The most preferable angle ranges of the angles of inclination A and B is 5 to 10 degrees (5 degrees≦A≦10 degrees, and 5 degrees≦B≦10 degrees).

The present invention is not limited to the above-mentioned embodiment. For example, as a conversion mechanism, the above-mentioned ball screw mechanism can be replaced with a bearing screw mechanism.

Figure 5:
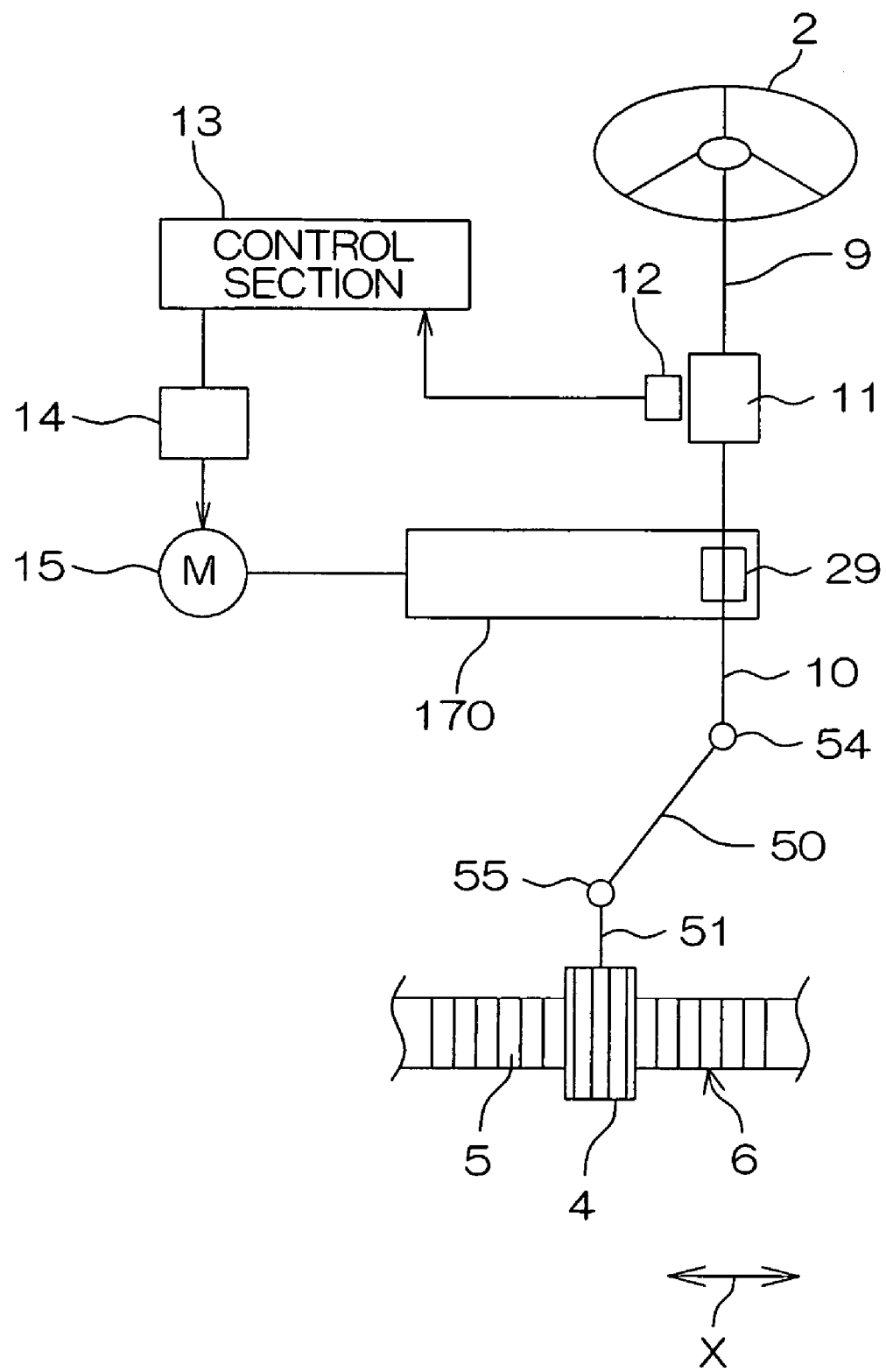
FIG. 5 is a schematic view showing a principal part of an electric power steering apparatus according to another embodiment of the present invention.

As shown in FIG. 5, an electric power steering apparatus may be so configured that the rotation of an electric motor 15 for steering assist is transmitted to an intermediate portion of an output shaft 10 in a steering shaft 3 through a speed reduction mechanism 170 comprising a pulley belt mechanism, to move a rack shaft 6 through an intermediate shaft 50 and a pinion shaft 51. An output pulley 29 in the speed reduction mechanism 170 may be provided so as to be rotatable integrally with the output shaft 10 of the steering shaft 3, which is not illustrated.

Figure 6:
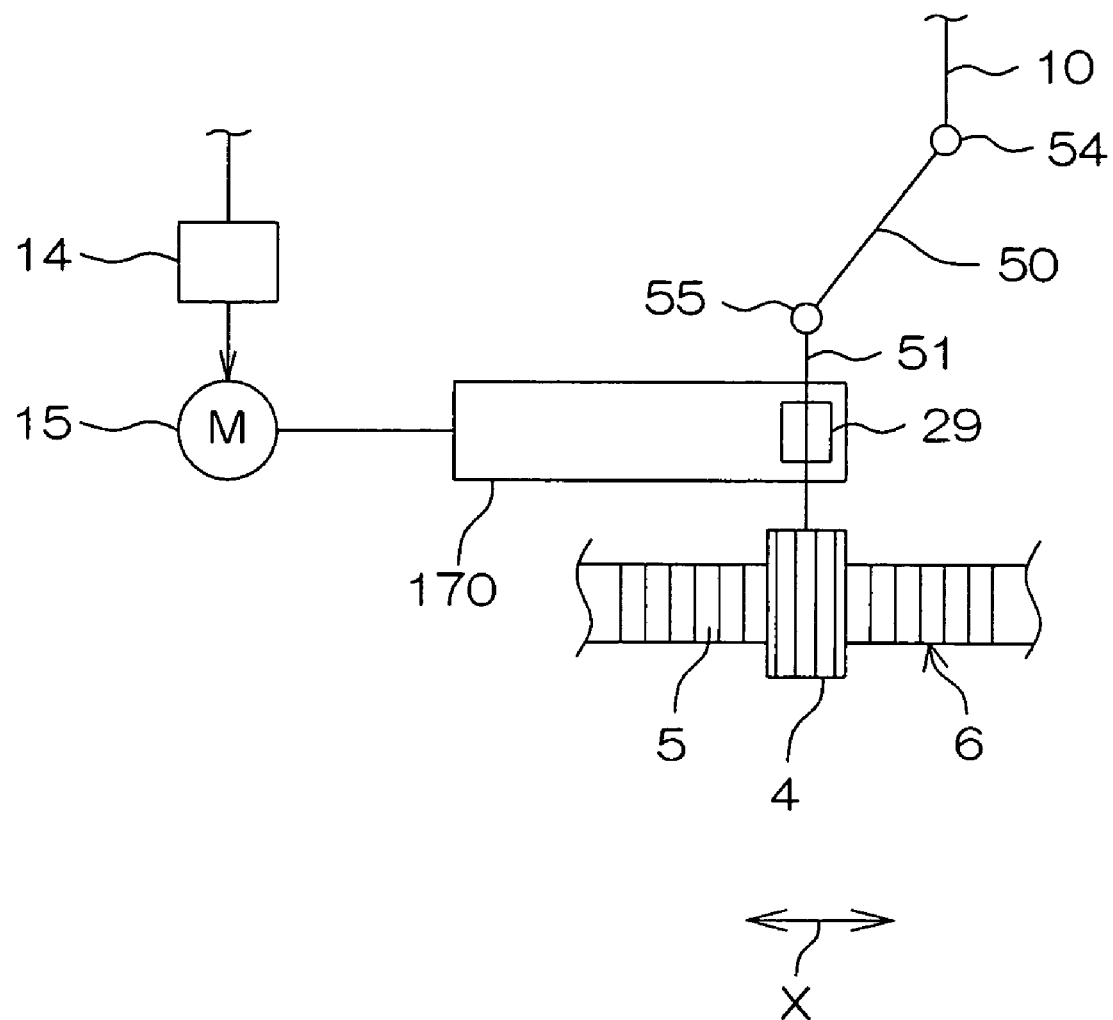
FIG. 6 is a schematic view showing a principal part of an electric power steering apparatus according to still another embodiment of the present invention.

As shown in FIG. 6, an electric power steering apparatus may be so configured that the rotation of an electric motor 15 for steering assist is transmitted to a pinion shaft 51 through a speed reduction mechanism 170 comprising a pulley belt mechanism, to move a rack shaft 6. An output pulley 29 in the speed reduction mechanism 170 may be provided so as to be rotatable integrally with the pinion shaft 51, which is not illustrated.

In the embodiments shown in FIGS. 5 and 6, the necessity of a screw mechanism such as a ball screw mechanism serving as a conversion mechanism 18 is eliminated.

Figure 7:
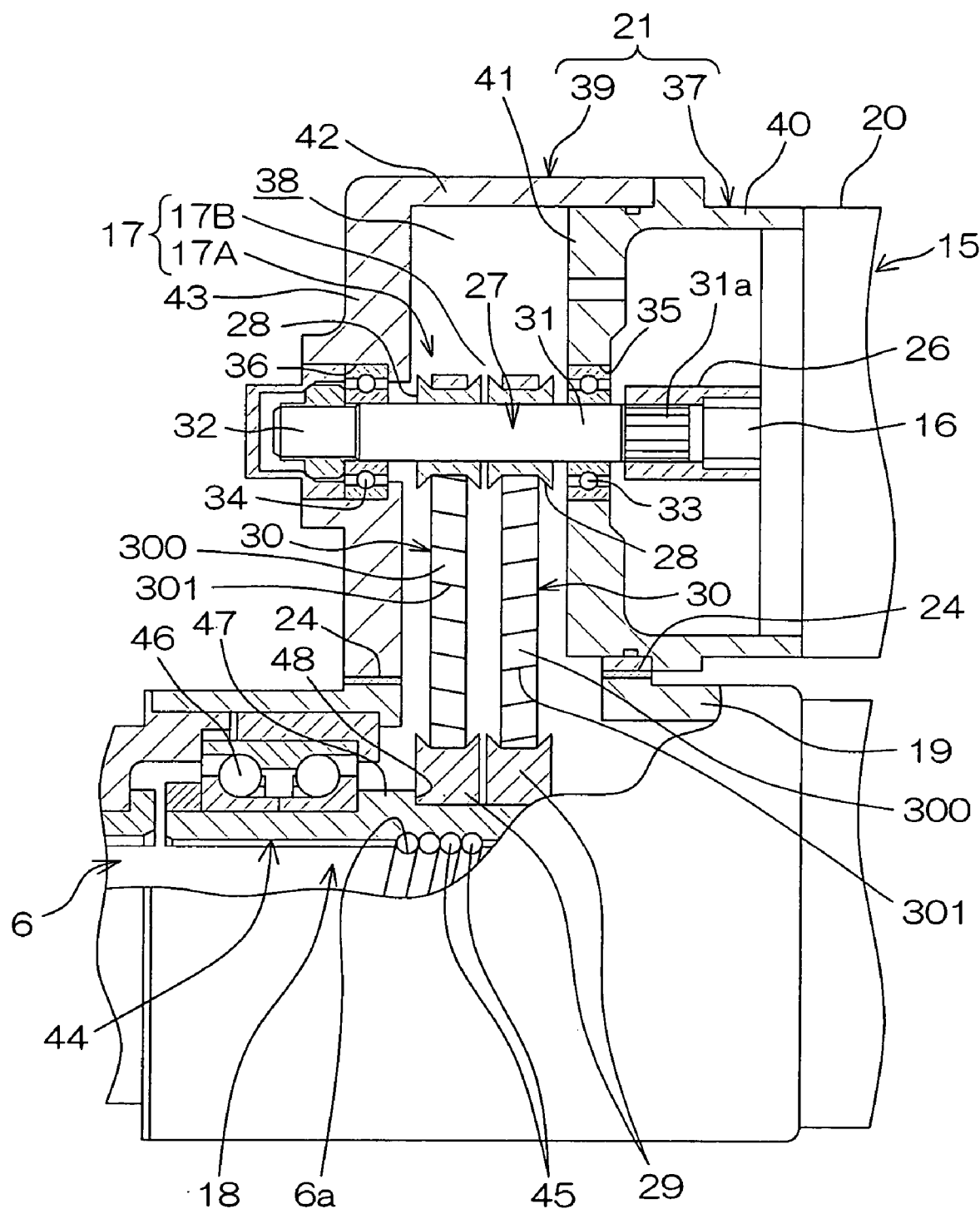
FIG. 7 is a schematic view showing a principal part of an electric power steering apparatus according to a further embodiment of the present invention.

As shown in FIG. 7, a pair of belt pulley mechanisms 17A and 17B may be provided as a speed reduction mechanism 17. That is, a pair of input pulleys 28 is provided coaxially with an input shaft 27, a pair of output pulleys 29 surrounding a steering shaft 6 is provided, and a pair of belts 30 respectively connecting the corresponding input and output pulleys 28 and 29 is provided. Each of the belt pulley mechanisms 17A and 17B is provided with the input pulley 28, the output pulley 29, and the belt 30.

Figure 8:
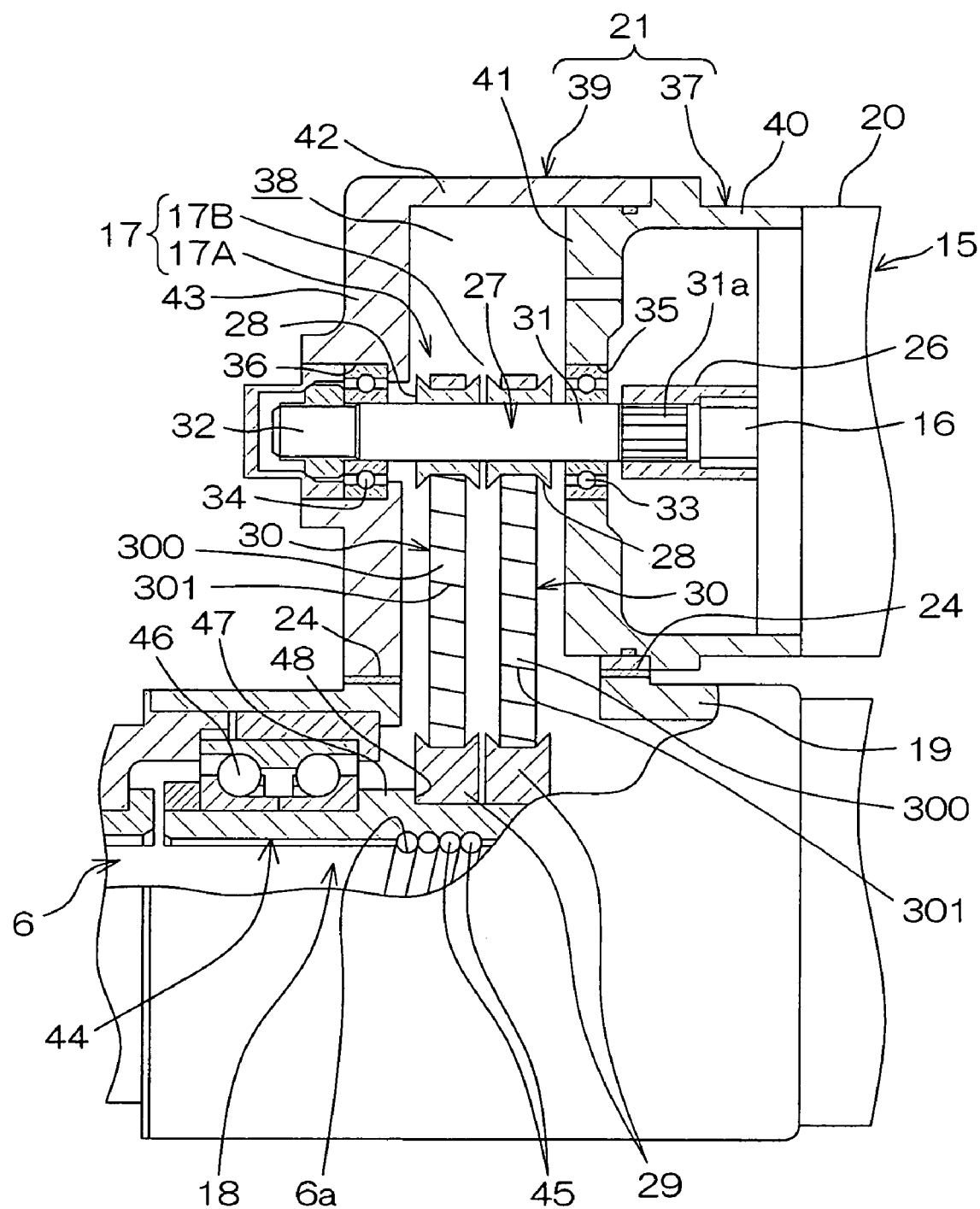
FIG. 8 is a schematic view showing a principal part of an electric power steering apparatus according to a still further embodiment of the present invention.

In this case, the respective helical teeth 300 of the belts 30 in the pair of belt pulley mechanisms 17A and 17B may be inclined in opposite directions, as shown in FIG. 7, or may be inclined in the same direction, as shown in FIG. 8. Alternatively, the respective phases of the helical teeth 280 in the pair of input pulleys 28 may be opposite to each other.

Although the present invention has been described and illustrated in detail by the specific embodiment, it is clearly understood that the same is by way of illustration and example only and is not to be taken by way of limitation, the spirit and scope of the present invention being limited only by the terms of the appended claims.

The present application corresponds to Japanese Patent Application No. 2003-110674 filed with the Japanese Patent Office on Apr. 15, 2003, the disclosure of which is hereinto incorporated by reference.

What is claimed is:

1. An electric power steering apparatus, comprising:
    an electric motor for producing a steering assist force;
    a steering shaft;
    a speed reduction mechanism for decelerating the rotation of an output shaft in the electric motor, the speed reduction mechanism including an input pulley driven by the electric motor, an output pulley connected to the steering shaft, and a belt for connecting the input pulley and the output pulley;
    a first housing accommodating the input pulley, the first housing being cylindrical and having a first section;
    a second housing accommodating the output pulley and the steering shaft, the second housing being cylindrical and having a second section opposed to the first section; and
    a spacer for changing a distance between centers of the input pulley and the output pulley and for adjusting a spacing between the first and second sections, the spacer having a plate shape and being interposed between the first and second sections,
    wherein:
    the belt includes a helical toothed belt; and
    the input pulley and the output pulley respectively include helical toothed pulleys meshed with the helical toothed belt.

2. The electric power steering apparatus according to claim 1, wherein the helical toothed belt comprises teeth, and an angle formed between a tooth trace of each of the teeth of the helical toothed belt and a width direction of the helical toothed belt is set to not more than 10 degrees.

3. The electric power steering apparatus according to claim 1, wherein the helical toothed belt comprises teeth, and an angle formed between a tooth trace of each of the teeth of the helical toothed belt and a width direction of the helical toothed belt is set in a range of 5 degrees to 10 degrees.

4. The electric power steering apparatus according to claim 1, wherein each of the helical toothed pulleys comprises teeth, and an angle of torsion of a tooth trace of each of the teeth of each of the helical toothed pulleys is set to not more than 10 degrees.

5. The electric power steering apparatus according to claim 1, wherein each of the helical toothed pulleys comprises teeth, and an angle of torsion of a tooth trace of each of the teeth of each of the helical toothed pulleys is set in a range of 5 degrees to 10 degrees.

6. The electric power steering apparatus according to claim 1, wherein the output pulley has an annular shape surrounding the steering shaft.

7. The electric power steering apparatus according to claim 1, further comprising:
    a first shaft connected to a steering wheel so as to be integrally rotatable,
    the steering shaft including a second shaft connected to the first shaft through a torsion bar so as to be relatively rotatable.

8. The electric power steering apparatus according to claim 1, further comprising:
    a first shaft connected to a steering wheel so as to be integrally rotable, a second shaft connected to the first shaft through a torsion bar so as to be relatively rotatable, and a rack extending along a width direction of a vehicle,
    the steering shaft including a pinion shaft meshed with the rack shaft.

9. The electric power steering apparatus according to claim 1, Wherein the spacer is a shim.

10. The electric power steering apparatus according to claim 1, wherein
    the speed reduction mechanism includes a pair of belt pulley mechanisms, and
    each of the belt pulley mechanisms is provided with the helical toothed pulley serving as the input pulley, the helical toothed pulley serving as the output pulley, and the helical toothed belt.

11. The electric power steering apparatus according to claim 10, wherein
    respective tooth traces of teeth of the helical toothed belts in the pair of belt pulley mechanisms are inclined in a same direction.

12. The electric power steering apparatus according to claim 10, wherein
    respective tooth traces of teeth of the helical toothed belts in the pair of belt pulley mechanisms are inclined in opposite directions.

13. The electric power steering apparatus according to claim 1, wherein the steering shaft includes a rack shaft extending along a width direction of a vehicle.

14. The electric power steering apparatus according to claim 13, further comprising a conversion mechanism for converting a rotation of the output pulley into an axial movement of the rack shaft.

15. The electric power steering apparatus according to claim 14, wherein:
    the conversion mechanism includes a ball screw mechanism;
    the ball screw mechanism comprises a ball nut surrounding the rack shaft and rotatable integrally with the output pulley;
    a screw groove is formed on a peripheral surface of the rack shaft; and
    a ball is interposed between the screw groove and the ball nut.

* * * * *